Oct. 16, 1962  E. W. CHRISTEN  3,058,141
WINDSHIELD CLEANING SYSTEM AND WIPER BLADES THEREFOR
Filed Aug. 25, 1958  3 Sheets-Sheet 1

INVENTOR.
EUGENE W. CHRISTEN
BY
W. E. Finkle
HIS ATTORNEY

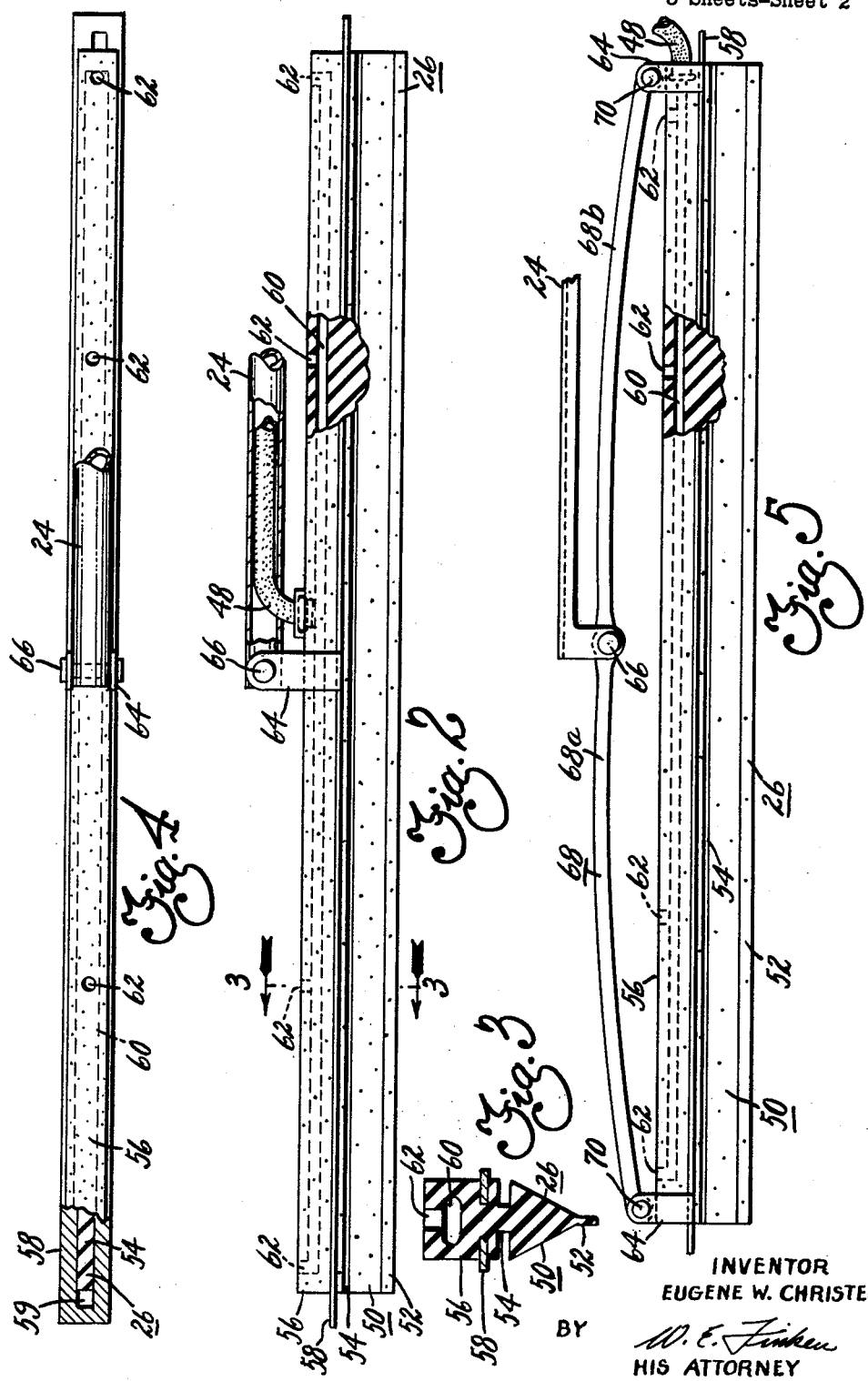

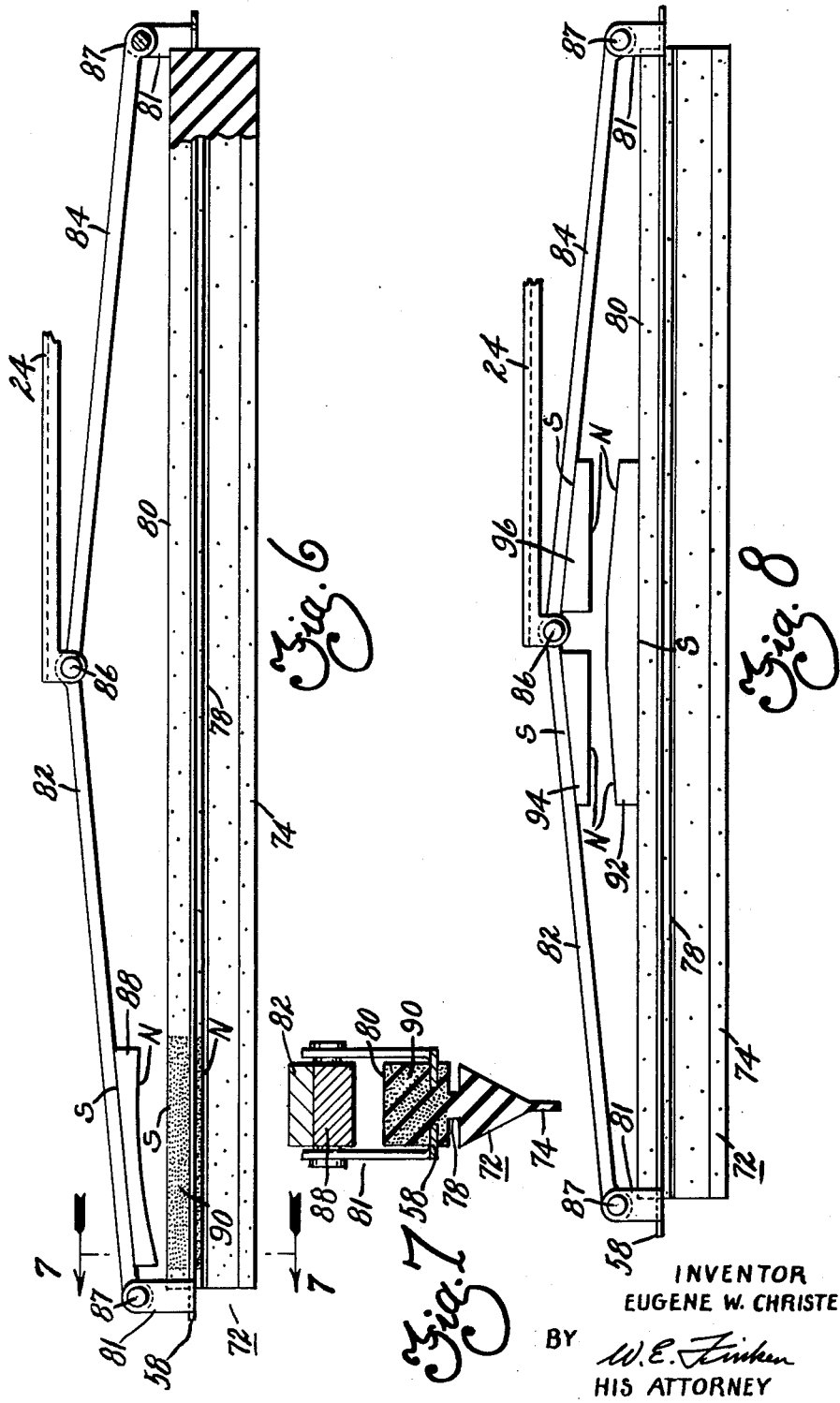

United States Patent Office
3,058,141
Patented Oct. 16, 1962

3,058,141
WINDSHIELD CLEANING SYSTEM AND WIPER BLADES THEREFOR
Eugene W. Christen, Farmington, Mich., assignor to General Motors Corporation, Detroit, Mich., a corporation of Delaware
Filed Aug. 25, 1958, Ser. No. 757,002
20 Claims. (Cl. 15—250.2)

This invention pertains to the art of windshield cleaning, and particularly to an improved cleaning system and wiper blades for cleaning a curved vehicular windshield.

Heretofore, it has been the practice to clean a vehicular windshield with one or more wiper blades, each wiper blade being carried by an arm which is spring biased towards the outer surface of the windshield. In conventional wiping apparatus, the arm includes spring hinge connected inner and outer sections, the outer section of which carries a wiper blade. Since substantially all of the windshields in present vehicles have curved surfaces, the wiper blade must be flexible in a plane substantially normal to the surface to be wiped, and substantially inflexible in a plane parallel to the surface to be wiped. Moreover, in order to adequately wipe a curved surface which may have concave as well as convex portions, the wiper arm pressure must be distributed along the length of the blade at a plurality of points so as to assure conformance to the blade to the curved surface.

Recent trends indicated that vehicular windshields will be increased in size and therefore require longer wiper blades. The use of longer wiper blades results in what is known as "wind-lift" of the blades, particularly in the sharply curved wrap-around portions of the windshield when the vehicle is driven at high speed. In order to prevent wind-lift, the wiper arm pressure has been substantially increased. For example, several years ago the standard wiper arm pressure was between six and eight ounces, but with the larger windishields and longer wiper blades the wiper arm pressure has been increased to sixteen ounces or more. In addition, in order to eliminate the undesirable effects of wind-lift the over-all profile of the blade including pressure distributing linkage for applying wiper arm pressure at a plurality of spaced points, has been lowered.

The present invention relates to an improved windshield cleaning system and wiper blades therefor wherein wiper blade conforming pressure is applied directly to the squeegee unit, comprising an elastomeric rubber wiping element and a flexible backing strip, either alone, or in combination with spring pressure derived from a wiper arm. One aspect of the present invention comprehends the use of wiper blade conforming pressure which increases with engine speed, and consequently vehicle speed, so as to obviate the problem of wind-lift of the wiper blades. Accordingly, among my objects are the provision of a windshield cleaning system for a curved vehicular windshield wherein the wiper blade conforming pressure is proportional to engine speed; the further provision of a cleaning system for a curved vehicular windshield wherein at least a portion of the wiper blade conforming pressure is applied directly to the squeegee unit from a source other than the wiper arm; the further provision of a flexible wiper blade assembly including means for applying conforming pressure directly to the squeegee unit at a plurality of longitudinally spaced points from a source other than the wiper arm; the further provision of a flexible wiper blade assembly including means for applying conforming pressure to the squeegee unit from two sources; the further provision of a flexible wiper blade assembly which utilizes the reaction force of a compressed gas for maintaining the wiper blade in contact with a surface; and the still further provision of a flexible wiper blade assembly including magnetic means for applying at least a portion of the conforming pressure to the squeegee unit.

The aforementioned and other objects are accomplished in the present invention by utilizing two sources of pressure for conforming a flexible squeegee unit to a curved surface. Specifically, in one embodiment the windshield cleaning system of this invention comprehends the use of compressed air, or other gas, as a pressure source for applying conforming pressure to a squeegee unit of a flexible wiper blade assembly. In the disclosed embodiment, the source of compressed air comprises an engine driven compressor whereby the compressor output varies with engine speed. However, it is to be understood that other sources of compressed air may be used such as the compressed air source of vehicles equipped with air suspension systems, or by bleeding off pressure from the engine cylinders on the compression strokes of the pistons.

The windshield cleaning system may include a pair of asymmetrically oscillated pivot shafts which are driven by any suitable type of actuating means, such as a pneumatic motor, a hydraulic motor, an electric motor or mechanically from a rotary part of the engine. The pivot shafts are drivingly connected to a pair of wiper arms having spring hinge connected inner and outer sections. In one aspect of the present invention, a light spring is used in the wiper arms, this spring being only of sufficient strength to maintain the wiper blades in contact with the windshield when the wiper motor is inactive.

In this embodiment, the flexible wiper blade assembly comprises a squeegee unit including a spring metal backing of greater width than thickness so as to be freely flexible in a single plane and substantially inflexible in a plane transverse thereto. In accordance with conventional practice, the squeegee also includes a rubber wiping element which is carried by the flexible backing, and the wiping element may be formed with a reduced neck portion so as to be tiltable relative to the backing thereby enabling the wiping lip, or feather edge, to assume a drag position as the wiper blade is oscillated across the surface of the windshield. In the first embodiment, the backing has a pair of standards attached to, or integral therewith, the central portion thereof to which the outer section of the wiper arm may be detachably connected. The wiper arm may be tubular in cross section so as to accommodate a conduit for supplying compressed air to the rubber wiping element. The rubber wiping element is formed with a longitudinally extending passage having a plurality of orifices, or jet nozzle outlets, directed away from the wiping lip thereof.

The wiper motor control mechanism is interconnected with a valve for controlling the connection of the compressed air source with the wiper blade. Thus, when the wiper motor is activated, so as to impart oscillation to the wiper blades, compressed air is supplied to the passage in the wiping element and ejected through the nozzles, or orifices, in a direction normal to, and away from, the windshield surface thereby producing a reaction force which urges the squeegee unit into engagement with the outer surface of the windshield and applies conforming pressure thereto. In instances where the source of compressed air comprises an engine driven compressor, the pressure urging the squeegee unit into engagement with the windshield is directly proportional to engine speed, and thus vehicle speed, so as to effectively obviate the problem of wind-lift. The air flow through the nozzle openings in the wiping element will also perform, to some extent, a defrosting action in cold weather or when ice or snow has accumulated on the blade structure.

In a second embodiment of the compressed air biased wiper blade, a slightly stronger spring is used in the wiper arm, and a single yoke pressure distributing structure is movably connected to the backing strip adjacent the ends thereof. In this embodiment the conduit for supplying compressed air may be connected directly to the wiper blade rather than extending through a channel or tubular section of the wiper arm.

Another aspect of the present invention comprehends the use of magnets as the second source of pressure for maintaining the wiper blade in contact with a windshield surface. In this embodiment, the squeegee unit may be connected at opposite ends to an arm pressure distributing linkage comprising a yoke which is centrally pivoted to the outer section of the wiper arm or which may take the form of a pair of levers which are pivotally interconnected to each other at their inner ends and to the outer section of the wiper arm. One or both of the levers comprising the yoke-type pressure distributing linkage may have a ceramic permanent magnet attached to the outer portion thereof between the linkage and the squeegee unit. The rubber wiping element has imbedded therein ceramic permanent magnetic material which is magnetized so that opposite poles of the magnetic material in the wiper element and on the pressure distributing linkage face each other whereby the squeegee unit will be attracted to the linkage system so as to assure conformance of one or both ends of the wiper blade with the sharply curved portions of a windshield surface. The ceramic permanent magnetic material may be of the type disclosed in copending application Serial No. 729,059 filed April 17, 1958, in the name of William E. Counts and assigned to the assignee of this invention. However, this specific type of ceramic material is disclosed only by way of example and not by way of limitation.

In the fourth embodiment, a pressure distributing linkage comprises a yoke in the form of two pivotally interconnected levers, each lever having a ceramic permanent magnet attached to the inner end portion adjacent the pivotal connection between the levers and the squeegee unit. The squeegee unit also has a ceramic permanent magnet attached thereto. In this embodiment like poles of the magnets face each other so that a repulsion force will be created whereby the auxiliary source of pressure urges the medial portion of the wiper blade into contact with the windshield and the spring pressure of the wiper arm urges the end portions into engagement with the windshield surface.

Further objects and advantages of the present invention will be apparent from the following description, reference being had to the accompanying drawings, wherein preferred embodiments of the present invention are clearly shown, and wherein similar numerals denote similar parts throughout the several views.

In the drawings:

FIGURE 2 is a side view, partly in elevation and partly in section, of a wiper blade and arm assembly constructed according to one embodiment of the present invention.

FIGURE 3 is a sectional view taken along line 3—3 of FIGURE 2.

FIGURE 4 is a plan view of the wiper blade and arm assembly shown in FIGURE 2, partly in elevation and partly in section.

FIGURE 5 is a side view, partly in elevation and partly in section, of a modified wiper arm and blade assembly.

FIGURE 6 is a side view, partly in elevation and partly in section, of a further modified wiper blade assembly.

FIGURE 7 is a sectional view taken along line 7—7 of FIGURE 6.

FIGURE 8 is a side view in elevation of a still further modified blade assembly.

Figure 1:
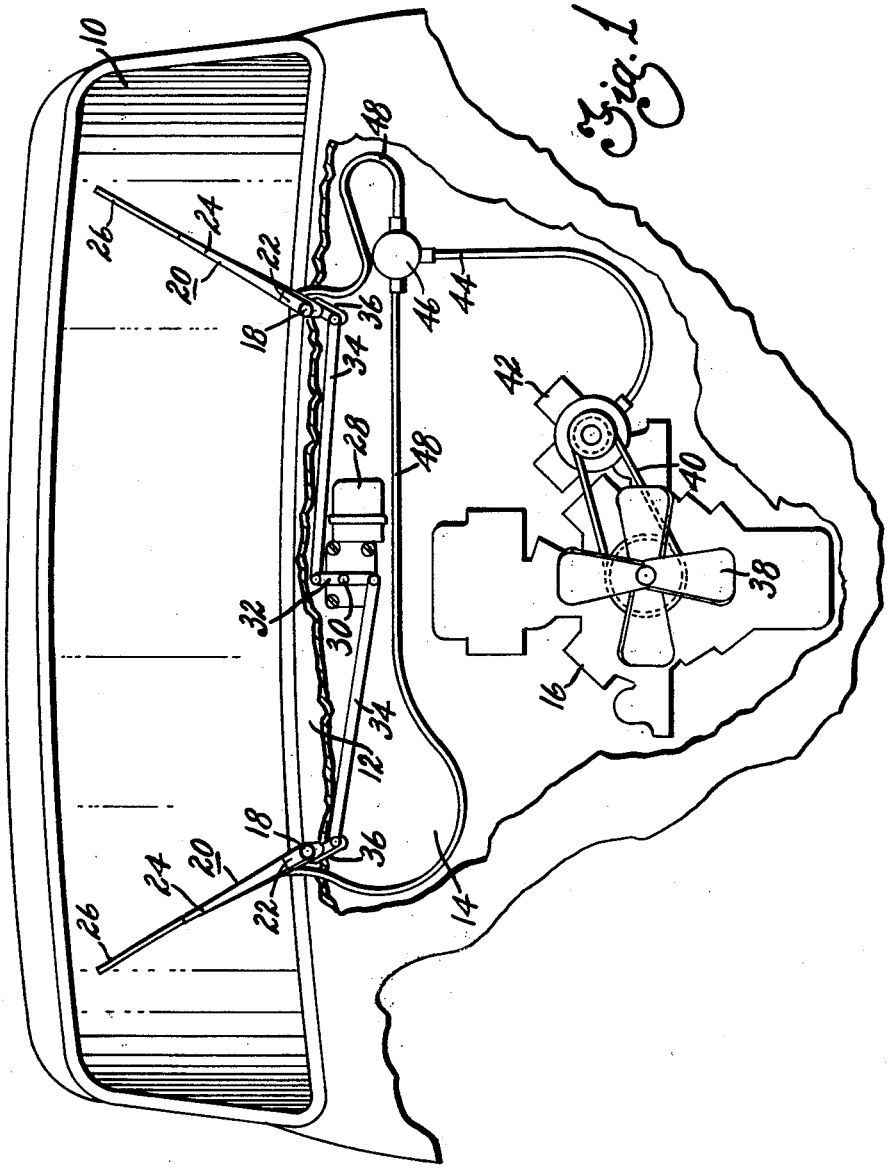
FIGURE 1 is a fragmentary view of an automobile having a windshield cleaning system constructed according to the present invention.

With particular reference to FIGURE 1, a portion of a vehicle is shown including a curved wrap-around windshield 10, a cowl 12, a firewall 14 and an engine 16. The improved windshield cleaning system of this invention includes a pair of spaced oscillatory pivot shafts 18 to which wiper arms 20 are drivingly connected. In accordance with conventional practice, the wiper arms 20 include spring hinge connected inner and outer sections 22 and 24, the outer section 24 of which carries a flexible wiper blade 26. The wiper blades 26 are asymmetrically oscillated across the outer surface of the windshield by power means 28 attached to the firewall 14. As shown, the power means are of the rotary type including a rotary output shaft 30 having a crank assembly 32 attached thereto to which the inner ends of connecting links 34 are pivotally connected. The outer ends of connecting links 34 may be connected by ball and socket joints, not shown, to crank arms 36 attached to the pivot shafts 18.

As alluded to hereinbefore, in conventional windshield cleaning systems all of the pressure for urging the wiper blades into conforming engagement with the curved windshield surface is derived from a single source, namely the spring hinge connected inner and outer sections of the wiper arm. However, in the windshield cleaning system of this invention the conforming pressure for the wiper blades is derived from two sources, namely the wiper arm and the auxiliary pressure source in the form of either pressurized fluid or permanent magnet means. Moreover, the secondary, or auxiliary pressure source, applies conforming pressure directly to the squeegee unit thus enabling the wiper blade to have a low profile so as to obviate the undesirable effects of wind-lift.

In the embodiment shown in FIGURE 1, the engine 16 includes a conventional cooling fan 38 having a drive pulley, not shown, for a fan belt 40. The fan belt 40 is used to drive an air compressor 42, which may be of the rotary crank shaft reciprocating piston type, to produce a source of air under pressure, the pressure potential of the air being directly proportional to engine speed, and hence variable speed. The output of the air compressor 42 which may include suitable pressure relief valves, not shown, is supplied through a conduit 44 to a valve 46. The valve 46 is controlled by the vehicle operator and is closed whenever the power means 28 for actuating the windshield wipers is inactive, and open whenever the power means 28 is activated. The valve 46 controls communication between the conduit 44 and flexible conduits 48 which are connected with the wiper blades in a manner to be described.

With particular reference to FIGURE 2 in the first embodiment, wiper blade 26 comprises a squeegee unit flexible in a plane normal to the surface to be wiped and substantially inflexible in a plane parallel to the surface to be wiped. The squeegee unit includes an elongate elastomeric wiping element 50 which, as seen in FIGURE 3, includes a wedge, or triangularly shaped wiping portion terminating in a wiping, or feathering, edge 52, and a reduced neck portion 54 permitting tilting movement of the wiping portion relative to the retention portion 56. In the disclosed embodiment, the retention portion is formed with a pair of marginal grooves within which a spring metal backing strip 58 is disposed. The flexible backing strip 58 constitutes a part of the squeegee unit and has a greater width than thickness so as to be freely flexible in a single plane and substantially inflexible in a plane transverse thereto. The backing strip is shown having an elongate intermediate slot 59 with closed outer ends which are received in the grooves of the retention portion 56 of the wiping element 50. In addition, the wiping element 50 has a longitudinally extending passage, or chamber 60, terminating short of the ends thereof adjacent the edge opposed to the wiping lip 52. As shown in FIGURE 2, four spaced orifices, or nozzles, 62 communicate with the chamber 60, the nozzles 62 being substantially normal to the surface to be wiped and extending away therefrom.

The backing strip 58 is formed with a pair of intermediate lugs, or standards 64, which project upwardly therefrom in a direction normal to the surface to be wiped to which the outer section 24 of the wiper arm 20 is connected by means of a pivot pin 66. The outer section 24 of the wiper arm may be tubular in cross section, as shown in FIGURE 2, or of channel shape. The flexible conduit 48 has a beaded end portion thereof retained within the outer section 24 of the wiper arm, and is connected to the passage 60 in the wiping element at the center thereof as shown in FIGURE 2.

As aforementioned, the inner and outer sections of the wiper arm are spring hinge connected, and in the embodiment shown in FIGURE 2, a very light spring is employed, which spring need only be sufficient to maintain the wiper blade in contact with the windshield when the wipers are not being operated. When the power means 28 are activated, the valve 46 is concurrently opened so as to supply air under pressure to the conduits 48 and passage 60. The compressed air will be ejected through the orifices 62 in a direction away from the windshield thereby producing a reaction force against atmosphere urging the squeegee unit, including the wiping element and the backing strip, against the outer surface of the windshield with a force directly proportional to the pressure potential of the compressed air source and hence the vehicle speed. The reaction force produced by the ejection of air through the nozzles 62 will be distributed along the length of the rubber wiping element 50 by the backing strip 58 so as to conform the squeegee unit to the curved windshield surface being traversed. Moreover, at higher speeds, the tendency of the blades to be lifted by the wind will be counteracted due to the greater pressure potential, and thus a greater reaction force produced by the compressed air ejected from the nozzles.

With reference to FIGURE 5, a modified wiper blade and arm assembly is disclosed wherein a stronger spring is employed between the inner and outer sections of the wiper arm. In the modified embodiment, a yoke-type arm pressure distributing linkage is utilized to distribute wiper arm pressure to the squeegee unit adjacent the ends thereof. Thus, in the embodiment shown in FIGURE 5, the backing strip 58 has upstanding lugs 64 adjacent the ends thereof to which the ends of a primary yoke 68 are loosely pivotally connected by pivot pins 70. The intermediate portion of the yoke is pivotally connected by a pivot pin 66 to the outer section 24 of the wiper arm 20. The yoke 68 may be unitary, or may comprise left and right levers 68a and 68b individually pivoted on the pin 66, the choice depending to some extent on the spring force of the backing strip 58.

In addition, in the embodiment shown in FIGURE 5, the passage, or chamber 60, is closed adjacent the outer end of the wiping element 50 and open adjacent the inner end thereof, and the conduit 48 is directly connected to the open inner end of the passage 60. The air ejection nozzles 62 operate in the same manner as in the first embodiment and the backing strip 58 distributes the secondary pressure created by the reaction force of the compressed air. The primary wiper arm pressure is applied directly to the backing strip and squeegee unit adjacent the ends thereof.

With reference to FIGURES 6 and 7, in a further modification, the flexible wiper blade comprises a squeegee unit including an elongate elastomeric wiping element 72 having a wiping portion with a wiping lip 74, a reduced neck portion 78, and a retention portion 80. As in the embodiment shown in FIGURES 2 and 5, the retention portion 80 is formed with a pair of grooves for receiving the flexible backing strip 58. In the embodiment shown in FIGURE 6, the backing strip 58 has upstanding lugs or standards 81 adjacent the ends thereof.

The pressure distributing linkage for the distributing arm pressure to the blade assembly shown in FIGURE 6 comprises a primary yoke structure in the form of a pair of levers 82 and 84, the inner ends of which are nested and pivotally interconnected to each other and with the outer section 24 of a wiper arm by a pivot pin 86. The outer ends of the levers 82 and 84 are loosely pivotally connected with the lugs 81 by pivot pins 87.

In the embodiment shown in FIGURE 6, a relatively strong hinge spring is connected between the inner and outer sections of the wiper arm to supply primary pressure for urging the wiper blade into engagement with the windshield surface and the backing strip 58 has a substantial spring action. Since it is well recognized that the most severely curved portions of a windshield are traversed by the outer tip section of the wiper blade, in order to assure conformance of the wiper blade with the sharply curved surfaces, additional pressure applying means in the form of permanent magnets are employed to locally bend the backing strip 58 at the outer end. Thus, the lever 82 has suitably attached thereto a permanent magnet 88, which may be of the ceramic having north and south poles as indicated by the letters N and S in FIGURE 6. The ceramic magnet 88 has a slightly concave inner surface. The portion of the wiping element 72 disposed beneath the permanent magnet 88 has embedded therein permanently magnetized powder 90 having south and north poles, as indicated. Since unlike poles attract each other and since the unlike poles of the magnets 88 and 90 face each other, as the wiper blade traverses the sharply curved portions at the corners of the windshield, the squeegee unit will be locally attracted to the permanent magnet 88 and assume a more pronounced curvature at the outer end to assure conformance of the squeegee unit with the curved surface. The attraction between the squeegee unit and magnet 88 will increase as the windshield curvature increases because of reduced air gap between poles.

With particular reference to FIGURE 8, the squeegee unit includes a wiping element of the type disclosed in the the embodiment shown in FIGURE 6, except that the retention portion does not have pulverized magnetic material embedded therein. The linkage for distributing arm pressure may again include a yoke in the form of pivotally interconnected levers 82 and 84. The blade construction depicted in FIGURE 8 is particularly adapted in installations where blades of appreciable length, such as sixteen inches, are required, in which instance the application of pressure adjacent only the ends of the squeegee unit will not enable the blade to readily conform to concave irregularities in the windshield surface. Accordingly, in order to assure conformance with both convex and concave surfaces, the backing strip 58 is made with substantially no spring action and a ceramic permanent magnet 92 is suitably bonded to the retention portion of the wiping element between the ends thereof. The ceramic magnet 92 has tapered end portions as indicated in FIGURE 8, and has north and south poles, as indicated. Each of the levers 82 and 84 likewise carries a permanent magnet 94 and 96 of triangular configuration having north and south poles as indicated. Since the north poles of the magnets 92, 94 and 96 face each other, the magnets tend to repel each other and produce a reaction force which will maintain the medial portion of the squeegee unit in conformance with the the windshield surface being traversed. In the embodiments of both FIGURES 6 and 8, the reaction force produced by the permanent magnets will be distributed to some extent along the entire length of the wiping element by the flexible backing strip 58.

While the embodiments of the invention as herein disclosed constitute preferred forms, it is to be understood that other forms might be adopted.

What is claimed is as follows:

1. A windshield cleaning system for a motor vehicle including, a wiper arm, a wiper blade carried by said arm and flexible in a plane normal to the windshield, power means connected to said arm for imparting to and fro motion thereto, a source of pressurized fluid, and means supplying said pressurized fluid to said wiper blade and ejecting said pressurized fluid from said wiper blade in a direction normal to the windshield to produce a reaction force for urging said wiper blade into engagement with the windshield.

2. In a motor vehicle having a windshield and an engine, a wiper blade, power means connected to said wiper blade for imparting to and fro movement thereto across the outer surface of said windshield, said engine providing a source of pressurized fluid, and means supplying said pressurized fluid to said wiper blade and ejecting said pressurized fluid from said wiper blade so as to produce a reaction force which urges said wiper blade into engagement with said windshield.

3. In a motor vehicle having a windshield and an engine, a wiper blade, power means connected to said wiper blade for imparting to and fro movement thereto across the outer surface of said windshield, means driven by said engine for developing a source of fluid under pressure, and means for supplying said fluid under pressure to said wiper blade and ejecting said fluid under pressure from said wiper blade so as to produce a reaction force which urges the wiper blade into engagement with said windshield.

4. In a motor vehicle having a windshield and an engine, a wiper blade, power means connected to said wiper blade for imparting to and fro motion thereto across the outer surface of the windshield, an air compressor driven by said engine having a pressure output proportional to engine speed, means supplying air under pressure from said compressor to said wiper blade and ejecting air from said wiper blade so as to produce a reaction force for urging said wiper blade into engagement with said windshield.

5. A windshield cleaning system for a motor vehicle including, a wiper blade, power means connected to said wiper blade for imparting to and fro motion thereto, a source of pressurized fluid, conduit means interconnecting the source of pressurized fluid and said wiper blade, valve means interposed between said conduit means and said source of pressurized fluid, and control means for the power means and said valve means for concurrently opening said valve means upon activation of said power means whereby said pressurized fluid will be supplied to said wiper blade upon movement thereof by said power means, said pressurized fluid being ejected from said wiper blade so as to produce a reaction force for urging the wiper blade into engagement with the windshield.

6. A windshield cleaning system for a vehicle including, a wiper arm having spring hinge connected inner and outer sections, a wiper blade carried by said wiper arm and urged into engagement with the windshield by said wiper arm, power means for imparting to and fro movement to said wiper arm, and fluid pressure operated means carried by the wiper blade and independent of the spring hinge connection of said wiper arm for applying additional force to said wiper blade for maintaining it in engagement with said windshield.

7. A windshield cleaning system including, a wiper arm including spring hinge connected inner and outer sections, a wiper blade carried by the outer section of said arm and urged into engagement with said windshield by said wiper arm, said wiper arm including a squeegee unit flexible in a plane normal to the surface to be wiped but substantially inflexible in a plane parallel to the surface to be wiped, power means for imparting to and fro motion to said wiper arm, and means carried by the wiper blade and independent of the spring hinge connection in said wiper arm for applying localized conforming pressure to said flexible squeegee unit.

8. A windshield cleaning system for a vehicle having a curved windshield including, a wiper arm having spring hinge connected inner and outer sections, a wiper blade connected to the outer section of the wiper arm and urged into engagement with said windshield by the wiper arm, said wiper blade including a squeegee unit freely flexible in a plane normal to the windshield surface and substantially inflexible in a plane parallel to the windshield surface, and means carried by the wiper blade and mechanically free of the connection between the wiper arm and blade for applying local pressure directly to said squeegee unit so as to conform the squeegee unit to the curved windshield surface.

9. A windshield cleaning system for a vehicle having a curved windshield including, a wiper arm having spring hinge connected inner and outer sections, a wiper blade connected to the outer section of the wiper arm and urged into engagement with said windshield by the wiper arm, said wiper blade including a squeegee unit freely flexible in a plane normal to the windshield surface and substantially inflexible in a plane parallel to the windshield surface, and means mechanically free of the connection between the wiper arm and blade for applying local pressure to said squeegee unit so as to conform the squeegee unit to the curved windshield surface, said last recited means comprising a source of pressurized fluid, and means supplying said pressurized fluid to said squeegee unit and ejecting said pressurized fluid therefrom so as to produce a reaction force for conforming the squeegee unit to the windshield surface.

10. A windshield cleaning system for a vehicle having a curved windshield including, a wiper arm having spring hinge connected inner and outer sections, a wiper blade connected to the outer section of the wiper arm and urged into engagement with said windshield by the wiper arm, said wiper blade including a squeegee unit freely flexible in a plane normal to the windshield surface and substantially inflexible in a plane parallel to the windshield surface, and means mechanically free of the connection between the wiper arm and blade for applying local pressure to said squeegee unit so as to conform the squeegee unit to the curved windshield surface, said wiper blade including pressure distributing linkage interconnecting the wiper arm and the squeegee unit, said last recited means comprising permanent magnet means carried in part by said pressure distributing linkage and in part by said squeegee unit for producing a reaction force to conform said squeegee unit to the windshield surface.

11. A wiper blade assembly including, a squeegee unit freely flexible in a plane normal to the surface to be wiped and substantially inflexible in a plane parallel to said surface, said squeegee unit including an elongate elastomeric wiping element having a wiping edge and a chamber terminating short of the ends of the blade in the edge opposed to the wiping edge, said chamber having a plurality of longitudinally spaced orifices extending substantially normal to the surface to be wiper and away from said surface through which pressurized fluid is ejected so as to produce a reaction force for conforming said squeegee unit to the curved windshield surface.

12. A flexible wiper blade including, a squeegee unit freely flexible in a plane normal to the surface to be wiped and substantially inflexible in a plane parallel to said surface, said squeegee including an elongate elastomeric wiping element and a flexible backing strip connected therewith and supporting the wiping element, means attached to the backing strip for applying wiper arm pressure thereto, said wiping element having a wiping edge and a chamber terminating short of the ends thereof adjacent the edge opposite the wiping edge, and a plurality of longitudinally spaced orifices communicating with said chamber and extending substantially normal to the surface to be wiped through which pressurized fluid can be ejected so as to produce a reaction force urging said squeegee unit into engagement with said surface.

13. The wiper blade set forth in claim 12 wherein said wiping element includes at least three orifices, two of which are adjacent the ends thereof and at least one other orifice disposed therebetween.

14. A flexible wiper blade including, a squeegee unit flexible in a plane normal to the surface to be wiped and substantially inflexible in a plane parallel to said surface, wiper arm pressure applying means connected to at least one point of said squeegee unit and urging it into engagement with said surface, and auxiliary pressure applying means carried by the wiper blade and independent of said wiper arm pressure applying means for applying conforming pressure directly to said squeegee unit.

15. A flexible wiper blade including, a squeegee unit flexible in a plane normal to a surface to be wiped and substantially inflexible in a plane parallel to said surface, wiper arm pressure applying means operatively connected to said squeegee unit adjacent each end thereof, and auxiliary pressure applying means carried by the wiper blade and independent of the wiper arm pressure applying means for applying additional conforming pressure directly to said squeegee unit.

16. A flexible wiper blade including, a squeegee unit freely flexible in a plane normal to the surface to be wiped and substantially inflexible in a plane parallel to said surface, an arm pressure distributing linkage operatively connected to said squeegee unit adjacent the ends thereof, said squeegee unit including an elongate elastomeric wiping element having a wiping edge and a chamber having closed ends adjacent the edge opposed to the wiping edge, and at least one orifice normal to the surface to be wiped and extending away therefrom communicating with said chamber through which pressurized fluid can be ejected so as to produce a reaction force for conforming said squeegee unit to said surface.

17. A flexible wiper blade including, a squeegee unit freely flexible in a plane normal to the surface to be wiped and substantially inflexible in a plane parallel thereto, said squeegee unit including an elongate elastomeric wiping element, and a flexible backing strip carrying said wiping element, arm pressure distributing means comprising a yoke, opposite ends of which are movably connected to the backing strip adjacent the ends thereof, said wiping element having a wiping edge and a chamber adjacent the edge opposed to the wiping edge, and at least one orifice communicating with said chamber intermediate the ends of said squeegee unit and extending substantially normal to said surface and away therefrom whereby pressurized fluid ejected from said orifice will produce a reaction force to conform said squeegee unit to said surface.

18. A flexible wiper blade including, a squeegee unit flexible in a plane normal to a surface to be wiped but substantially inflexible in a plane parallel to said surface, wiper arm pressure applying linkage means operatively connected to said squeegee unit adjacent the ends thereof, and permanent magnet means carried by said linkage means and said squeegee unit intermediate the ends of said squeegee unit, said magnetic means reacting to produce a force between the ends of the squeegee unit for conforming the squeegee unit to said surface.

19. The wiper blade set forth in claim 18 wherein said permanent magnet means comprises a ceramic magnet attached to said linkage means and permanently magnetized powder embedded in the squeegee unit.

20. The flexible wiper blade set forth in claim 18 wherein said permanent magnet means comprises magnets carried by the squeegee unit and the linkage intermediate the ends of the blade and having like magnetic poles facing each other.

References Cited in the file of this patent

UNITED STATES PATENTS

| | | |
|---|---|---|
| 1,357,869 | Howard | Nov. 2, 1920 |
| 2,313,201 | Klein | Mar. 9, 1943 |
| 2,626,416 | Turek | Jan. 27, 1953 |
| 2,706,291 | Rappl | Apr. 12, 1955 |
| 2,748,416 | Benoit | June 5, 1956 |
| 2,763,023 | Horton | Sept. 18, 1956 |
| 2,772,436 | Deibel | Dec. 4, 1956 |

FOREIGN PATENTS

| | | |
|---|---|---|
| 559,923 | Italy | Mar. 27, 1957 |